US010613029B2

(12) United States Patent
Jungwirth et al.

(10) Patent No.: US 10,613,029 B2
(45) Date of Patent: Apr. 7, 2020

(54) APPARATUS AND METHOD FOR FORMING AN ALIGNMENT CELL

(71) Applicant: Honeywell International Inc., Morristown, NJ (US)

(72) Inventors: Matthew Edward Lewis Jungwirth, Golden Valley, MN (US); James Goeders, Plymouth, MN (US); Bernard S. Fritz, Eagan, MN (US); Thomas Ohnstein, Roseville, MN (US); Kris Fredrick, Lino Lakes, MN (US); Daniel Youngner, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1394 days.

(21) Appl. No.: 14/686,611

(22) Filed: Apr. 14, 2015

(65) Prior Publication Data

US 2020/0064263 A1  Feb. 27, 2020

(51) Int. Cl.
*G01N 21/64* (2006.01)
*H01J 49/00* (2006.01)
*H01J 49/42* (2006.01)

(52) U.S. Cl.
CPC .......... *G01N 21/64* (2013.01); *H01J 49/0018* (2013.01); *H01J 49/42* (2013.01)

(58) Field of Classification Search
CPC .......... G01N 21/64; G01N 2021/6484; G01N 2021/6463; H01J 49/0018; H01J 49/42; H01J 49/424
See application file for complete search history.

(56) References Cited

U.S. PATENT DOCUMENTS

| | | | | |
|---|---|---|---|---|
| 5,679,950 A | * | 10/1997 | Baba | G01N 21/6404 250/281 |
| 5,926,271 A | * | 7/1999 | Couderc | G01N 21/05 356/318 |
| 6,795,189 B2 | * | 9/2004 | Booker | G01N 21/6452 250/458.1 |
| 7,180,078 B2 | | 2/2007 | Pau et al. | |
| 7,807,963 B1 | * | 10/2010 | Bier | H01J 49/422 250/281 |

(Continued)

FOREIGN PATENT DOCUMENTS

DE  20320889 U1  9/2005
WO  2001096837 A1  12/2001

OTHER PUBLICATIONS

Brady, Gregory R., et al. "Integration of fluorescence collection optics with a microfabricated surface electrode ion trap." Applied Physics B 103.4 (2011): 801-808 (Year: 2011).*

(Continued)

*Primary Examiner* — Wyatt A Stoffa
(74) *Attorney, Agent, or Firm* — Brooks, Cameron & Huebch, PLLC

(57) ABSTRACT

An apparatus and method for an alignment cell are described herein. One apparatus includes a delivery fiber and a delivery lens coupled to an optical bench, a mirror to receive light from the delivery fiber through the delivery lens, wherein the received light is directed by the mirror to an ion trap on the trap surface, and a collection fiber coupled to the optical bench to receive light fluoresced from an ion in the ion trap.

13 Claims, 5 Drawing Sheets

(56) References Cited

U.S. PATENT DOCUMENTS

| | | | | |
|---|---|---|---|---|
| 7,859,350 B1* | 12/2010 | Schwindt | ............... | H03L 7/099 |
| | | | | 331/3 |
| 8,395,112 B1* | 3/2013 | Bier | ...................... | G01N 21/53 |
| | | | | 250/281 |
| 2008/0018894 A1* | 1/2008 | Zu | ...................... | G01N 15/1459 |
| | | | | 356/338 |
| 2009/0135429 A1* | 5/2009 | Masuda | ................ | G02B 6/327 |
| | | | | 356/477 |
| 2009/0213444 A1* | 8/2009 | Goto | ..................... | B82Y 10/00 |
| | | | | 359/107 |
| 2011/0036995 A1* | 2/2011 | Binnie | ............... | G01N 15/1459 |
| | | | | 250/459.1 |
| 2013/0277575 A1 | 10/2013 | Peng et al. | | |
| 2014/0004559 A1* | 1/2014 | Hill | ....................... | G01N 21/01 |
| | | | | 435/34 |
| 2016/0305882 A1* | 10/2016 | Goeders | ............. | G01N 21/6404 |
| 2017/0304818 A1* | 10/2017 | Brown | ................... | B01L 3/502 |
| 2018/0003636 A1* | 1/2018 | Goeders | ............. | G01N 21/6404 |

OTHER PUBLICATIONS

Examination Report from related European Application No. 16154743. 5, dated Jun. 26, 2017, 6 pages.

Brady, G.R., et al., "Integration of flouresence collection optics with a microfabricated surface electrode ion trap", Appl Phys B (2001), vol. 103, pp. 801-808, Springer.

Extended Search Report from related European application 16154743.5 dated Oct. 10, 2016 (11 pp.).

\* cited by examiner

US 10,613,029 B2

APPARATUS AND METHOD FOR FORMING AN ALIGNMENT CELL

STATEMENT OF GOVERNMENT RIGHTS

This invention was made with Government support under contract: W911NF-12-1-0605, awarded by the U.S. Army. The Government has certain rights in this invention.

TECHNICAL FIELD

The present disclosure relates to an apparatus and method for forming an alignment cell.

BACKGROUND

An ion trap can use a combination of electrical and magnetic fields to trap (e.g., capture) an ion (e.g., a positively charged ion). When an ion trapped in an ion trap is illuminated by a laser (e.g. when a laser beam is shined on the ion in the trap), the ion may fluoresce light. The light fluoresced from the ion can be detected by a detector.

Multiple ion traps can be formed on a chip (e.g., die). However, in previous approaches, each additional ion trap (e.g., each additional trapped ion) may necessitate additional structure (e.g., hardware) and/or space, including, for instance, additional lasers. For example, in previous approaches there may be a linear (e.g., one-to-one) relationship between the number of ions and the number of lasers (e.g., each additional ion may necessitate an additional laser).

Further, previous approaches may not be able to achieve single ion addressing. That is, previous approaches may not be able to individually address multiple ions such that the light fluoresced from only a single ion at a time can be detected by the detector.

DETAILED DESCRIPTION

Figure 1:
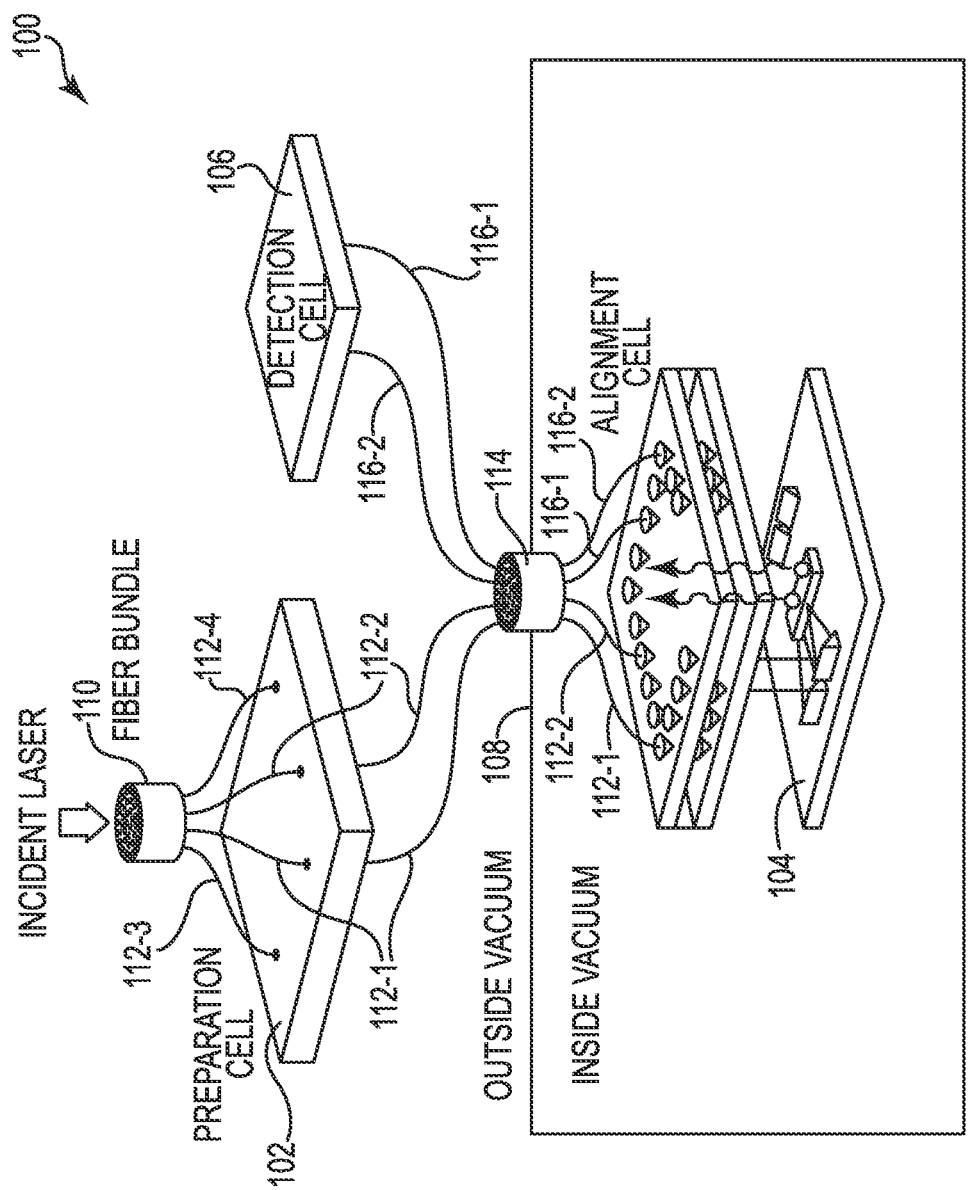
FIG. 1 illustrates an example apparatus for single ion addressing in accordance with one or more embodiments of the present disclosure.

An apparatus and method for forming an alignment cell system are described herein. For example, one or more embodiments includes an apparatus comprising a delivery fiber and a delivery lens coupled to an optical bench (e.g., silicon optical bench, etc.), a mirror to receive light from the delivery fiber through the delivery lens, wherein the received light is directed by the mirror to an ion trap on the trap surface, and a collection fiber coupled to the optical bench to receive light fluoresced from an ion in the ion trap.

The alignment cell system as described herein can receive a plurality of delivery fibers that are coupled to a preparation cell. The preparation cell can prepare incident laser light for the alignment cell. The alignment cell can include a plurality of ion traps on a trap surface that can be illuminated with laser light from the coupled delivery fibers. The ions can fluoresce light upon being illuminated by the incident laser light. The fluoresced light can be directed to a collection fiber coupled to the alignment cell. The collection fiber can send the fluoresced light from the ion to a detection cell.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 3.

As used herein, "a" or "a number of" something can refer to one or more such things. For example, "a number of lasers" can refer to one or more lasers.

FIG. 1 illustrates an example apparatus 100 for single ion addressing in accordance with one or embodiments of the present disclosure. As shown in FIG. 1, apparatus 100 can include a first cell (e.g., optical cell) 102, a second cell (e.g., optical cell) 104, and a third cell (e.g., optical cell) 106. That is, cells 102, 104, and 106 can be three separate cells. Cell 102 can be referred to as a preparation cell, cell 104 can be referred to as an alignment cell, and cell 106 can be referred to as a detection cell. As shown in FIG. 1, cells 102 and 106 can be outside a vacuum (e.g., vacuum chamber) 108, and cell 104 can be inside vacuum 108.

Cell 102 (e.g., the preparation cell) can set a frequency and a polarization of a laser (e.g., a laser beam), and shutter the laser. In some embodiments, cell 102 may prepare the state of the laser, and in some embodiments, the state of the laser may already be prepared before the laser enters cell 102.

In some embodiments, the laser may be a Doppler cooling laser (e.g., a laser used in a Doppler cooling mechanism), and in some embodiments the laser may be a quantum operation laser (e.g., a laser used in a quantum operation, such as Raman cooling, state preparation, quantum transitions, and/or gating, for instance). In both such embodiments, the laser may be a 369 nanometer (nm) laser. However, embodiments of the present disclosure are not limited to a particular type of laser.

Cell 104 (e.g., the alignment cell) can align the shuttered laser to (e.g., focus the shuttered laser on) an ion trapped in an ion trap, such that the ion fluoresces (e.g., emits) light or undergoes a quantum operation. Cell 104 can receive the light fluoresced from the ion. Cell 104 will be further described herein. In some embodiments, the ion in the ion trap can be a ytterbium (Yb) ion. However, embodiments of the present disclosure are not limited to a particular type of ion.

Cell 106 (e.g., the detection cell) can receive (e.g., collect) the light fluoresced from the ion from cell 104, and detect (e.g., measure) the light fluoresced from the ion. For example, cell 106 can include an array of photo-multiplier tubes that can detect the light (e.g., photons) fluoresced from the ion. However, embodiments are not limited to a particular type of detection cell.

As shown in FIG. 1, apparatus 100 can include a first fiber bundle 110 and a second fiber bundle 114. Fiber bundle 110 can split an incident laser into a plurality of components before the laser enters cell 102. For instance, fiber bundle 110 can split the laser into a plurality of fibers (e.g., wires) 112-1, 112-2, 112-3, 112-4 (e.g., each laser component can propagate through a different fiber) before the laser (e.g., the laser components) enters cell 102, as illustrated in FIG. 1. That is, the fibers split, and each fiber enters cell 102 separately, as illustrated in FIG. 1. Although the embodiment illustrated in FIG. 1 includes four fibers, embodiments of the present disclosure are not limited to a particular number of fibers.

As shown in FIG. 1, fiber bundle 114 can bundle (e.g., re-bundle) the plurality of fibers 112-1, 112-2, 112-3, and 112-4 after the laser (e.g., after the fibers) exits cell 102 and before the laser (e.g., before the fibers) enters vacuum 108. For clarity and so as not to obscure embodiments of the present disclosure, only fibers 112-1 and 112-2 are shown being bundled by fiber bundle 114 in FIG. 1. The laser (e.g., the bundled fibers) can then enter vacuum 108 through fiber bundle 114, as illustrated in FIG. 1.

After the laser (e.g., after the fibers) enters vacuum 108, fiber bundle 114 can split (e.g., re-split) the plurality of fibers 112-1, 112-2, 112-3, 112-4, as shown in FIG. 1. For clarity and so as not to obscure embodiments of the present disclosure, only fibers 112-1, and 112-2 are shown being split by fiber bundle 114 in FIG. 1. The laser (e.g., the re-split fibers) can then enter cell 104. That is, the fibers re-split, and each fiber enters cell 104 separately, as illustrated in FIG. 1.

The light fluoresced from the ion can exit cell 104 through one or more of an additional plurality of fibers (e.g., wires) 116-1, 116-2, as illustrated in FIG. 1. Although the embodiment illustrated in FIG. 1 includes two such additional fibers, embodiments of the present disclosure are not limited to a particular number of such additional fibers.

As shown in FIG. 1, fiber bundle 114 can bundle the additional plurality of fibers 116-1, 116-2, (e.g., the fiber(s) having the light fluoresced from the ion) before the light fluoresced from the ion (e.g., before the fibers) exit vacuum 114. After the light fluoresced from the ion (e.g., after the fibers) exits vacuum 108, fiber bundle 114 can split (e.g., re-split) the additional plurality of fibers 116-1, 116-2, as shown in FIG. 1. The light fluoresced from the ion (e.g., the re-split fibers) can then enter cell 106. That is, the fibers re-split, and each fiber enters cell 106 separately, as illustrated in FIG. 1.

The number of ions a single laser can individually address using apparatus 100 may depend on three factors: the power of the illuminating laser, the laser power needed at the ion for the ion to fluoresce light, and the loss caused by the components within cell 102 that set the frequency and polarization of the laser, shutter the laser, and prepare the state of the laser (e.g., the electro-optic modulator (EOM), the acousto-optic modulator (AOM), and the Pockels cell described in connection with FIGS. 2A and 2B). For example, the total transmission $T_{tot}$ in cell 102 can be given by:

$$T_{tot}=T_{EOM}T_{AOM}T_{Pockels}=0.3*0.7*0.99=0.2$$

where $T_{EOM}$, $T_{AOM}$, and $T_{Pockels}$ are the estimated transmissions of the EOM, AOM, and Pockels cell, respectively. The power at the ion $\phi_{ion}$ can then be given by:

$$\phi_{ion}=T_{tot}\phi_{laser}=0.2*\phi_{laser}$$

where $\phi_{laser}$ is the power of the laser. The number of ions N that the laser can individually address can be given by:

$$N=\phi_{ion}/\phi_{required}=(0.2*\phi_{laser})/\phi_{required}$$

where $\phi_{required}$ is the laser power needed at the ion for the ion to fluoresce light. These equations can be solved to estimate the number of ions that can be simultaneously addressed.

Figure 2:
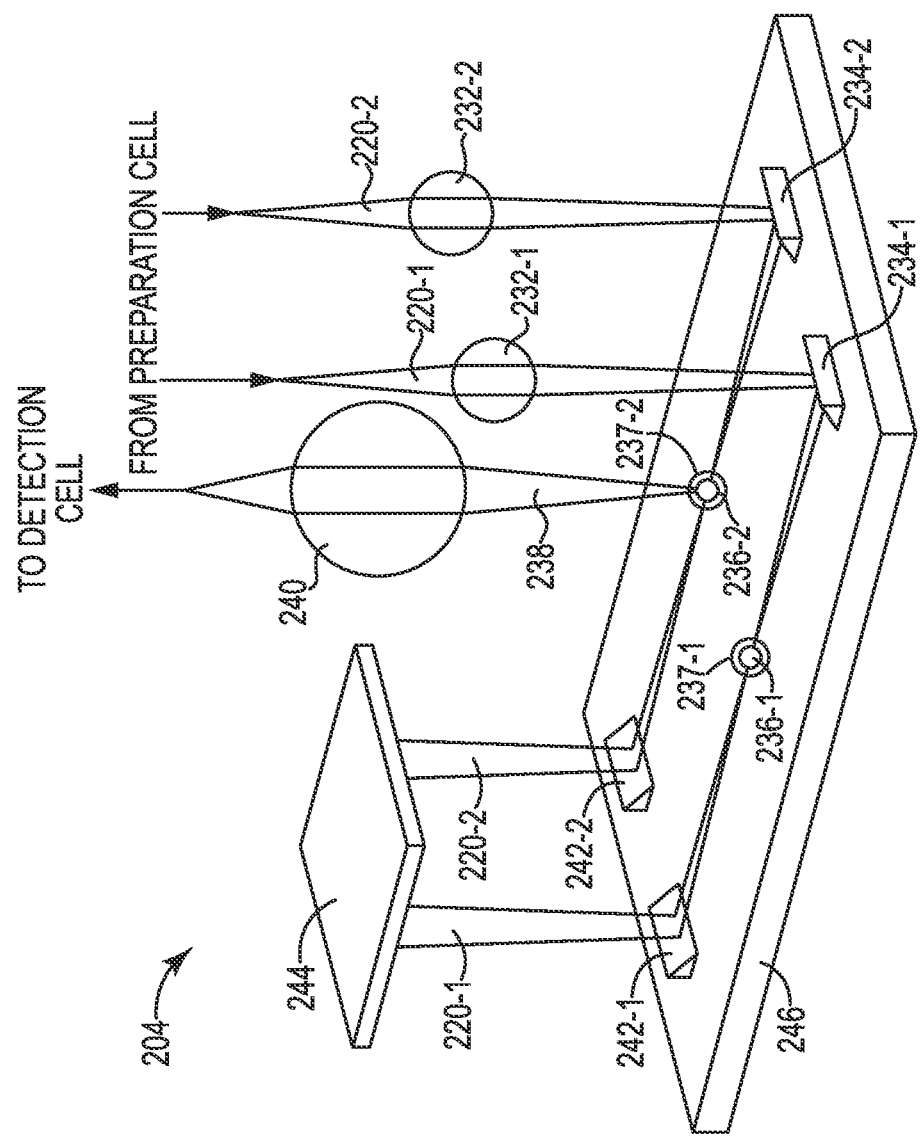
FIG. 2 illustrates a portion of an alignment cell system in accordance with one or more embodiments of the present disclosure.

FIG. 2 illustrates a portion of an alignment cell system 204 in accordance with one or embodiments of the present disclosure. Alignment cell 204 can be, for example, alignment cell 104 of apparatus 100 previously described in connection with FIG. 1.

As shown in FIG. 2, a first component 220-1 and a second component 220-2 of a laser (e.g., laser beam) from a preparation cell (e.g., preparation cell 102 previously described in connection with FIG. 1) can enter alignment cell 204. For example, laser component 220-1 can enter (e.g. be input into) alignment cell 204 from a first fiber (e.g., fiber 112-1 previously described in connection with FIG. 1), and laser component 220-2 can enter alignment cell from a second fiber (e.g., fiber 112-2 previously described in connection with FIG. 1), as previously described herein (e.g., in connection with FIG. 1).

As shown in FIG. 2, alignment cell 204 can include a first lens 232-1 and a second lens 232-2. Lenses 232-1 and 232-2 can be, for example ball lenses. Further, the focal length of lenses 232-1 and 232-2 can be set to garner a particular beam waist and location for a given ion operation.

As shown in FIG. 2, lens 232-1 can focus laser component 220-1, and direct laser component 220-1 at mirror 234-1 formed (e.g., placed) on the surface of chip (e.g., die, trap surface, etc.) 246. Lens 232-2 can focus laser component 220-2, and direct laser component 220-2 at mirror 234-1 formed on the surface of chip 246. The distance between the centers of lenses 232-1 and 232-2 and the surface of chip 246 can be, for example, three millimeters (mm).

As shown in FIG. 2, mirror 234-1 can direct (e.g., reflect) the focused laser component 220-1 at ion 236-1 trapped in an ion trap formed on chip 246, such that ion 236-1 is illuminated by focused laser component 220-1. Mirror 234-2 can direct the focused laser component 220-2 at ion 236-2 trapped in an additional ion trap formed on chip 246, such that ion 236-2 is illuminated by focused laser component 220-2.

The distance between mirror 234-1 and ion 236-1, and the distance between mirror 234-2 and ion 236-2, can be, for example, 2.5 mm. The distance between ion 236-1 and 236-2 can be, for example, 0.5 mm. Ions 236-1 and 236-2 can be, for example, Ytterbium (Yb) ions. However, embodiments of the present disclosure are not limited to a particular type of ion.

As shown in FIG. 2, ion 236-2 may fluoresce (e.g., emit) light 238 when illuminated by focused laser component 220-2. Fluoresced light 238 can be received (e.g., coupled) by lens 240 of alignment cell 204. Lens 240 can be, for example, a ball lens having a diameter of 2 mm. Further, the focal length of lens 240 can be set to couple fluoresced light 238 into a fiber (e.g., output fiber) exiting alignment cell 204. In some embodiments, the ion trap can include a micro mirror 237-1, 237-2 to direct the fluoresced light from the ion to the lens 240.

As shown in FIG. 2, fluoresced light 238 can exit alignment cell 204 after being received (e.g., coupled) by lens 240, and travel to a detection cell (e.g., detection cell 106 previously described in connection with FIG. 1). For example, fluoresced light 238 can exit (e.g. be output from) alignment cell 204, and travel to the detection cell, through a fiber (e.g., fiber 116-1 or 116-2 previously described in connection with FIG. 1), as previously described herein (e.g., in connection with FIG. 1).

As shown in FIG. 2, mirror 242-1 (e.g., dump mirror) formed on the surface of chip 246 can direct (e.g., reflect) laser component 220-1 at beam dump 244 of alignment cell 204 after laser component 220-1 is aligned to (e.g., focused at), and illuminates, ion 236-1. Mirror 242-2 formed on the surface of chip 246 can direct laser component 220-2 at beam dump 244 after laser component 220-2 is aligned to, and illuminates, ion 236-2. Laser components 220-1 and 220-2 can terminate at (e.g., upon reaching) beam dump 244. Terminating laser components 220-1 and 220-2 at beam dump 244 can mitigate stray light and/or heating in alignment cell 204.

Alignment cell 204 may be designed as a unit cell that can be repeated across an array (e.g., a 2D array) of ion traps formed on chip 246. That is, the embodiment illustrated in FIG. 2 can be repeated across an array of ion traps formed on chip 246. However, only one alignment cell 204 has been shown in FIG. 2 for clarity and so as not to obscure embodiments of the present disclosure.

Figure 3:
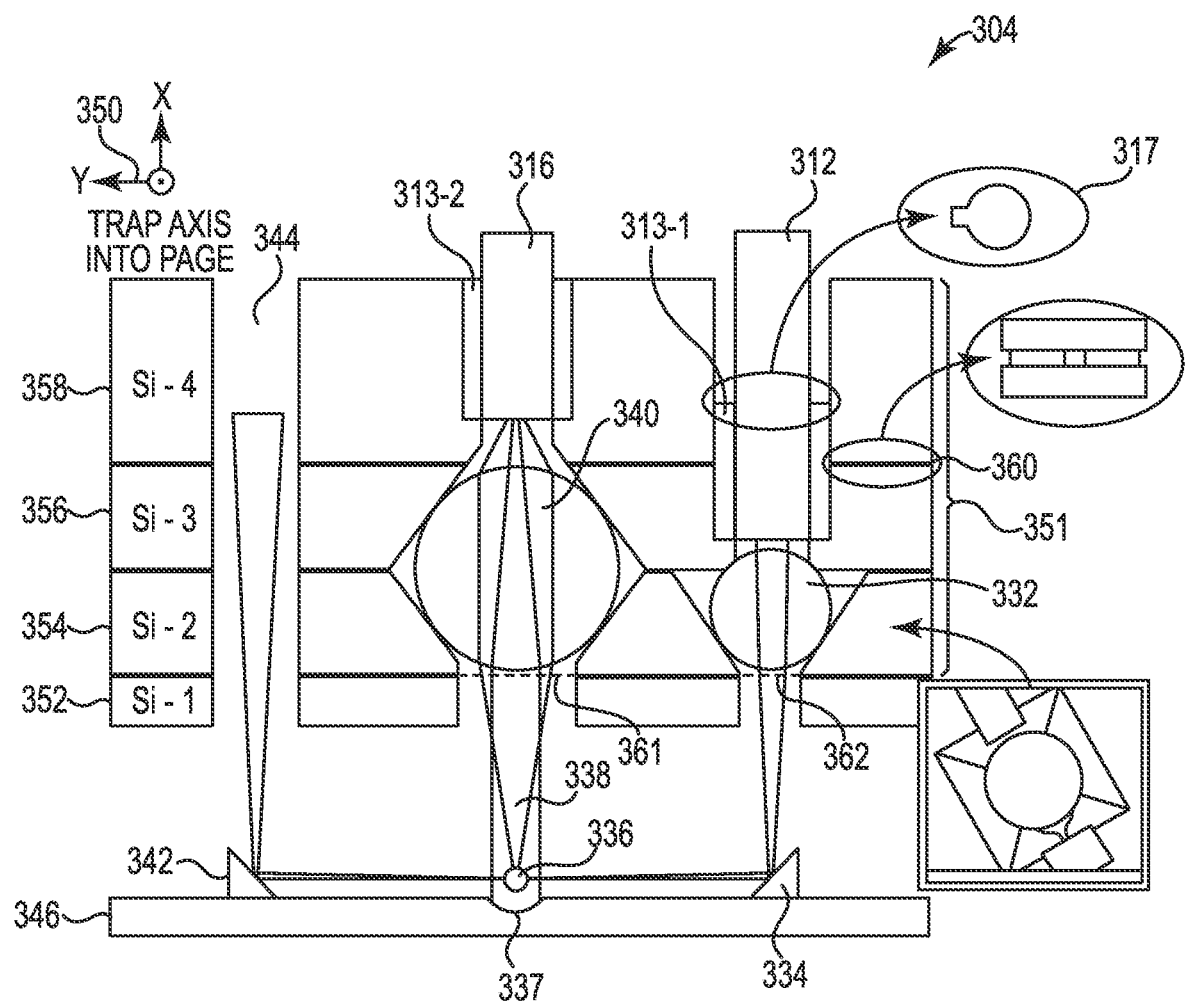
FIG. 3 illustrates a portion of an alignment cell system in accordance with one or more embodiments of the present disclosure.

FIG. 3 illustrates a portion of an alignment cell system 304 in accordance with one or embodiments of the present disclosure. The system 304 can be a portion of an apparatus for single ion addressing as described herein in reference to FIG. 1. FIG. 3 illustrates a compass 350 illustrating an x-axis and y-axis of the alignment cell system 304. As described herein, the alignment cell system can include additional ion traps and/or additional systems for addressing the ion traps that can be located at a z-axis going into the page of FIG. 3. In some embodiments the system 304 can be repeated a plurality of times in the y-axis direction.

The system 304 can include a trap surface 346 (e.g., surface of chip, die, etc.) that can include a number of ion traps. The number of ion traps 337 can be utilized to isolate and trap an ion 336. In some embodiments, the number of ion traps can include a micro mirror 337 (e.g., prism mirror, etc.) that can direct fluoresced light from the ion 336 in the ion trap to a fiber 316 (e.g., collection fiber).

The trap surface 346 can include a mirror 334 (e.g., delivery mirror, etc.). The mirror 334 can be coupled (e.g., attached, etc.) to the trap surface 346 to direct light from a fiber 312 to the ion 336 in the ion trap as described herein. The trap surface 346 can also include a mirror 342 (e.g., dump mirror, etc.). The mirror 342 can direct excess light (e.g., light not absorbed by the ion 336, etc.) that passes past the ion 336 to a beam dump 344. In some embodiments, the mirror 334 can be a flat mirror. In these embodiments, the mirror 334 can receive focused light from a lens 332. In other embodiments, the mirror 334 can be a concave mirror. In these embodiments, the lens 332 may be removed and the concave mirror can be utilized to focus and direct the received beam from fiber 312 to the ion 336. For example, the concave mirror can replace mirror 334 and can alter a beam width and direct the beam to the ion 336. Utilizing a concave mirror for mirror 334 can reduce the number of lenses utilized in the system 304.

In some embodiments, an optical bench 351 can be located above the trap surface 346. The optical bench 351 can be constructed utilizing a number of silicon wafers 352, 354, 356, 358 or similar material. The number of silicon wafers 352, 354, 356, 358 can be etched to form the cavities that encase the lenses 332, 340 and/or couple the fibers 312, 316, as well as form a through-hole to a beam dump 344. The etching process to construct the optical bench 351 is described further herein. In some embodiments, the silicon wafers 352, 354, 356, 358 can be bonded together to form a single unit. For example, the silicon wafer 356 can be bonded to the silicon wafer 358 with a metal layer 360 via a Solid-Liquid-Interdiffusion (SLID) Process bonding technique. In some embodiments, the silicon wafer 356 can be bonded to the silicon wafer 358 with a metal layer 360 via a number of different wafer bonding techniques.

The optical bench 351 can include a fiber 312 (e.g., delivery fiber, etc.) coupled to a portion of the optical bench 351. In some embodiments, a first portion of a locking mechanism (e.g., a key hole 317, a slot, hole, or other such opening) can be formed on the inside of the apertures (e.g., fiber receivers, etc.). This mechanism can be formed so as to provide alignment and/or locking of the fiber(s) 312, 316 into the apertures. In some such embodiments, the fibers 312, 316 can include a second portion of the locking mechanism that is a reciprocal shape that will interface with the first portion provided in the aperture in such a manner as to mechanically lock the fibers 312, 316 to the aperture. For example, the key hole 317 and matching key on the fiber ferrule 312 can be utilized to maintain an orientation of the beam polarization. As described herein, the beam polarization can be set by the preparation cell that is coupled to the fiber 312. As described herein, the fiber 312 can be coupled to a preparation cell (e.g., preparation cell 102 as referenced in FIG. 1, etc.) and receive light from an incident laser coupled to a fiber bundle (e.g., fiber bundle 110 as referenced in FIG. 1, etc.).

The fiber 312 can be coupled to the optical bench 351 at a particular distance from a lens 332 (e.g., ball lens, delivery lens, delivery ball lens, etc.) and a particular distance from the mirror 334 coupled to the trap surface 346. The distance from the lens 332 and/or the distance from the mirror 334 can be based on a focal length of the lens 332. For example, the focal length of the lens 332 can be utilized to determine a location (e.g., distance from the lens 332, etc.) of the fiber 312 for a particular beam waist of the received light from the fiber 312. In another example, the focal length of the lens 332 can be utilized to determine a location of the fiber 312 for a particular ion trap location on the trap surface 346.

In some embodiments, the lens 332 can be a ball lens that is encased in the optical bench 351 by etching a pyramidal etch pit. The pyramidal etch pit can be utilized to protect the lens 332 and/or to hold the lens 332 in a particular position (e.g., particular distance from the fiber 312 based on the focal length of the lens 332, particular distance from the mirror 334 based on the focal length of the lens 332, etc.). In some embodiments, the lens 332 can be a 1 millimeter diameter ball lens. As described herein, the lens 332 can be utilized to focus the light received from the fiber 312 on to the mirror 334. In addition, the mirror 334 can receive the light through the lens 332 and direct the light to an ion 336 within an ion trap. In some embodiments, the lens 332 can be a ball lens that is spliced on an end of the fiber 312.

As described herein, when the received laser light is directed at the ion 336, the ion 336 can fluoresce light 338.

The light 338 fluoresced from the ion 336 can be directed to a lens 340 by a micro mirror 337. The micro mirror 337 can be located beneath the location of the ion (e.g., under the ion trap, at the location of the ion trap, etc.). In some embodiments, the micro mirror 337 can be utilized to focus more of the light 338 fluoresced from the ion 336 compared to embodiments without the micro mirror 337.

The light 338 fluoresced from the ion 336 can be directed by the micro mirror 337 to the lens 340 (e.g., ball lens, collection lens, collection ball lens, etc.). The lens 340 can be encompassed in the optical bench 351 in a similar manner as the lens 332. In a similar, but opposite manner, the focal length of the lens 340 can be utilized to determine a distance from the ion and/or to determine a distance from the fiber 316 (e.g., collection fiber, etc.). For example, the focal length of the lens 340 can be utilized to encase the lens 340 in the optical bench 351 at a position that focuses the light 338 fluoresced from the ion 336 into the fiber 316. As described herein, the fiber 316 can be coupled to a detection cell (e.g., detection cell 106 as referenced in FIG. 1, etc.).

As described herein, the optical bench 351 can be constructed utilizing a number of silicon wafers 352, 354, 356, 358 that can be etched to perform the functionality described herein and bonded together. For example, the system 304 can be constructed by a method comprising constructing a trap surface 346 comprising a delivery mirror 334 and a dump mirror 342 coupled to the trap surface 346 comprising an ion trap, and constructing a silicon optical bench 351 over the trap surface 346 comprising: etching a through-hole out of each of the number of silicon wafers 352, 354, 356, 358, etching a first pyramidal etch pit out of a portion of the number of silicon wafers 352, 354, 356, 358 to receive a delivery ball lens 332, wherein the first pyramidal etch pit is positioned above the delivery mirror 334, etching a first fiber receiver out of a portion of the number of silicon wafers 352, 354, 356, 358 to receive a first fiber 312, wherein the first fiber receiver is positioned above the first pyramidal etch pit, etching a second pyramidal etch pit out of a portion of the number of silicon wafers 352, 354, 356, 358 to receive a collection ball lens 340, wherein the second pyramidal etch pit is positioned above the ion trap, and etching a second fiber receiver out of a portion of the number of silicon wafers 352, 354, 356, 358 to receive a second fiber 316, wherein the second fiber receiver is positioned above the second pyramidal etch pit.

In some embodiments, an optional first electrically-grounded screen 361 can be inserted between ion 336 and lens 340 to mitigate the effects of charge build-upon lens 340. In other embodiments, a second electrically-grounded screen 362 can be inserted between lens 332 and mirror 334 to mitigate the effects of charge build-upon lens 332. In some embodiments, constructing the silicon optical bench 351 can include a number of etching and/or bonding steps for each of the number of silicon wafers 352, 354, 356, 358. One example of etching and/or bonding steps is described as follows. In this example, the silicon wafer 352 can have straight sidewall holes etched through the silicon wafer 352 below a portion of the silicon wafer 352 that encases the ball lenses 332, 340. The silicon wafer 352 can be utilized to protect a bottom portion of the lenses 332, 340. In this example, each of the silicon wafers 352, 354, 356, 358 can have a through-hole etched at a position below a beam dump 344 and above the mirror 342.

In this example, the silicon wafer 354 can have pyramidal angle-walled structures etched into the silicon wafer 354 using anisotropic etching. Anisotropic etching can etch along specific crystal planes in silicon to form the angle-walled holes. In some embodiments, the wafer 354 can be utilized to hold the lenses 332, 340. In this example the silicon wafer 352 can be bonded to silicon wafer 354. The silicon wafer 352 can be bonded to silicon wafer 354 utilizing a SLID Process bonding technique.

The SLID process can use a metal system of Au—In to form a bond between two silicon wafers at a relatively low temperature (e.g., 200° C. to 250° C.). This process temperature is relatively lower than a typical metal-Silicon eutectic bond such as Au—Si (e.g., 360° C.). Once this bond between the wafers is formed, unbonding of the wafers can require a much higher temperature (e.g., greater than 350° C.) than that used to form the bond. Additional silicon wafers can be bonded in sequence at the same or similar relatively low temperature of formation while the previous wafer bonds remain bonded together. This process can be repeated to form the entire stack of silicon wafers.

The silicon wafer 356 can have inverted pyramidal structures etched into the silicon wafer 356 to form covers for the lenses 332, 340. The openings for the fiber 312 can also be etched into the silicon wafer 356. In some embodiments, the opening for the fiber 312 can be etched utilizing deep reactive ion etching (DRIE). In some embodiments, the opening for the fiber 312 can include a first locking mechanism as described herein. In addition, the fiber 312 can include a corresponding second locking mechanism that interacts with the first locking mechanism. As described herein, the beam polarization can be set by the preparation cell coupled to the fiber 312 and the locking mechanism can lock the fiber 312 to maintain the beam polarization.

In this example, the lenses 332, 340 can be placed in the respective lens pits that were etched into the silicon wafers 354, 356. When the lenses 332, 340 are placed in the respective lens pits, the silicon wafers 354, 356 can be bonded together as described herein. In some embodiments, the lenses 332, 340 can be placed by automated pick-and-place machinery.

In this example, DRIE etching can be used to etch a keyed alignment hole for the fiber 316 into the silicon wafer 358. In addition, the silicon wafer 358 can have a through-hole etched into the silicon wafer 358 at a position above the opening for the fiber 312. The silicon wafer 358 can then be bonded to silicon wafer 356 as described herein.

In this example, the fibers 312, 316 and other fibers not shown (e.g., fibers into the page, etc.) can have a gold coated keyed ferrule 313-1, 313-2. The fibers 312, 316 can be inserted into the keyed hole and bonded to the silicon wafer using an Au/Si eutectic bonding technique. The fibers 312, 316 can be bonded individually by local heating and/or by bonding multiple fibers via a heating fixture.

This example of constructing the system 304 can be utilized to extend the system 304 to utilize multiple fibers and/or multiple ion traps simultaneously. For example, the system 304 can be viewed as a single unit cell. In this example, a plurality of additional unit cells can be added into and out of the page. For example, the system 304 can include thousands of alignment and trap unit cells. Assembling the system 304 with the plurality of unit cells may include aligning particular fibers and lenses to corresponding ion traps. In some embodiments, each of the unit cells can be aligned by tiling each unit cell into a fixture that can be utilized to couple each unit cell.

In some embodiments, the fixture can include a three-axis and in-plane rotation controls for fine alignment of the plurality of unit cells and corresponding ion trap array. The controls can be vacuum compatible (e.g., operational under vacuum, etc.) and can be utilized to lock down a unit cell to prevent movement of the unit cell after positioning. In some embodiments, the fine alignment controls can utilize optical alignment techniques similar to photolithographic techniques used to make integrated circuits or microelectromechanical system (MEMS) structures used in the system 304. For example, a number of marks can be placed on the trap surface 346 and could be aligned to a number of corresponding marks on the optical bench 351 structure.

In some embodiments, a diffractive optical element (DOE) can be utilized instead of the lenses 332, 340. The DOE can be an optical element that utilizes diffraction instead of refraction to focus or disperse received light. These embodiments can be advantageous since they replace a stand-alone element with an element that can be fabricated into the optical bench 351. Thus, these embodiments can potentially decrease tolerance sensitivity. In these embodiments, the DOEs can utilize a lower throughput than a standard refractive element. For example, a DOE can have a diffraction efficiency of approximately 98 percent. However, a ball lens can have a transmissions of approximately 99 percent. In some embodiments, a DOE can have an optical axis that may have to be aligned to a specific orientation. However, a ball lens may not have to be aligned to a specific orientation. In addition, the DOEs can be lithographically fabricated. That is, the DOEs can be made from the same or similar mask as the silicon wafers 354, 356. Thus, the system 304 can reduce errors due to alignment and human placement of ball lenses.

Figure 4:
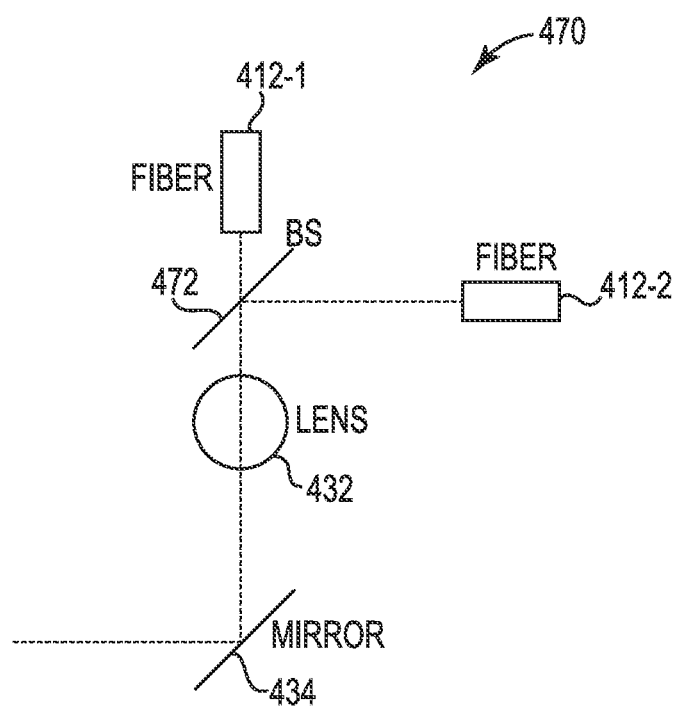
FIG. 4 illustrates a portion of an alignment cell system in accordance with one or more embodiments of the present disclosure.

FIG. 4 illustrates a portion of an alignment cell system 470 in accordance with one or embodiments of the present disclosure. The system 470 can represent a number of fibers 412-1, 412-2 that are coupled to a preparation cell to provide light the portion of the alignment cell system 470. The system 470 can be utilized by an alignment cell to provide co-propagated light from the number of fibers 412-1, 412-2 to an ion within an ion trap.

The system 470 can include a first fiber 412-1 (e.g., vertical fiber, orthogonal fiber, fiber coupled to a first laser, etc.) that is coupled to a preparation cell (e.g., preparation cell 102 as referenced in FIG. 1). The first fiber 412-1 can be coupled to a particular type of laser (e.g., QO laser, DC laser, etc.). The system 470 can include a second fiber 412-2 (e.g., horizontal fiber, fiber orthogonal with the first fiber 412-1, fiber coupled to a second laser, etc.) that is coupled to the preparation cell. The second fiber 412-2 can be coupled to a particular type of laser that is different than the laser coupled to the first fiber 412-1. For example, the first fiber 412-1 can be coupled to a QO laser and the second fiber 412-2 can be coupled to a DC laser. In some embodiments, the second fiber 412-2 can be at a position that is orthogonal with the first fiber 412-1. For example, the first fiber 412-1 can be relatively vertical and the second fiber 412-2 can be relatively horizontal.

The system 470 can include a beam splitter (BS) 472 that is coupled to the first fiber 412-1 and the second fiber 412-2. The beam splitter 472 can be utilized to force a light beam from the first fiber 412-1 and a light beam from the second fiber 412-2 to co-propagate (e.g., allow multiple beams to propagate to the mirror 434 simultaneously, combine the multiple beams, etc.). In some embodiments the beam splitter 472 can include an optical device that can split received light into two portions. For example, the beam splitter 472 can split received light into a first portion that is transmitted through the beam splitter 472 and a second portion that is reflected by the beam splitter 472.

The beam splitter 472 can allow a portion of the light from the fiber 412-1 to transmit through to the lens 432 (e.g., ball lens, DOE, etc.) and to the mirror 434 (e.g., flat mirror, concave mirror, etc.) while reflecting a portion of the light away from the lens 432 and the mirror 434. In a similar manner, the beam splitter 472 can allow a portion of the light from the fiber 412-2 to transmit through the beam splitter 472 away from the lens 432 an the mirror 434 while reflecting a portion of the light to the lens 432 and the mirror 434. Thus, the beam splitter 472 can co-propagate light from the first fiber 412-1 and the second fiber 412-2.

In some embodiments, the distance between the lens 432 and the first fiber 412-1 can be different than the distance between the lens 432 and the second fiber 412-2. The difference in distance between the lens and the fibers 412-1, 412-2 can allow for different beam waists at the ion in the ion trap for the first fiber 412-1 and the second fiber 412-2. Thus, different beam waists can be achieved while utilizing the same size lens 432. Alternatively, the fibers 412-1 and 412-2 can have different optical characteristics (e.g., mode field diameter, numerical aperture, etc.) to achieve different beams waists at the ion. The mirror 434 (e.g., delivery mirror, etc.) can direct the received light from the lens 432 to an ion in an ion trap in the same or similar manner as described herein.

Figure 5:
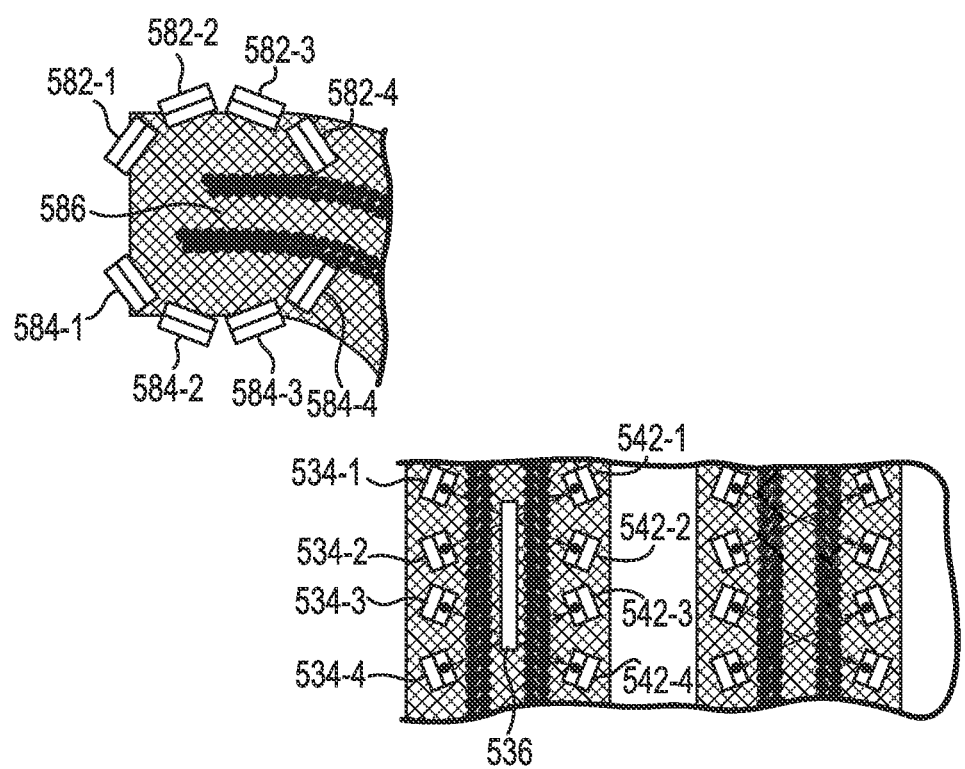
FIG. 5 illustrates a trap environment system in accordance with one or more embodiments of the present disclosure.

FIG. 5 illustrates a trap environment system 580 in accordance with one or more embodiments of the present disclosure. The trap environment system 580 can include a number of loading zones 586 and logic zones 536 of an trap (e.g., ion trap, molecule trap, etc.).

In some embodiments, the number of loading zones 586 can include zones of the trap environment system 580 where ions are introduced into the trap environment system 580. For example, a material such as Ytterbium (Yb) can be placed below the number of loading zones 586 and heated with a heating device (e.g., plate heater, etc.). The heat can create a gas of Yb molecules entering the trap environment system 580 through an aperture at the number of loading zones 586. The Yb molecules in this example can be interfaced with a laser to ionize the Yb molecules.

In previous systems and methods, a number of lasers for ionizing molecules entering the trap environment system 580 would be located orthogonal (e.g., parallel, relatively parallel, etc.) to the loading zone 586 surface. The trap environment system 580 can include a number of mirrors 582-1, 582-2, 582-3, 582-4 that can receive incident light from a laser above the loading zone 586 surface. That is, incident light from the laser can be received from a position above the number of mirrors 582-1, 582-2, 582-3, 582-4 to direct the incident light from the laser towards the number of molecules entering the trap environment system 580.

The incident light from the laser that is directed towards the loading zone 586 from the number of mirrors 582-1, 582-2, 582-3, 582-4 can interact with the molecules entering the trap environment system 580 and then hit a corresponding number of mirrors 584-1, 584-2, 584-3, 584-4 that can direct the light towards a beam dump as described herein. That is, each of the number of mirrors 584-1, 584-2, 584-3, 584-4 can be positioned across the loading zone 586 from a corresponding number of mirrors 582-1, 582-2, 582-3, 582-4 to receive the incident light from a laser and direct the incident light towards a beam dump.

In some examples, the trap environment system 580 can include a plurality of through silicon vias (TSV)s and trench capacitors to allow for the number of mirrors 582-1, 582-2, 582-3, 582-4, 584-1, 584-2, 584-3, 584-4 to be positioned either on the trap surface (e.g., die surface, silicon surface, etc.) or on the interposer surface of the trap environment system 580. In addition, the TSVs and trench capacitors can be utilized to move the ions generated at the loading zone 586 to the logic zone 536.

In some embodiments, the logic zone 536 can be utilized to perform logical tests on the ions utilizing a number of lasers as described herein. For example, the logic zone 536 can utilize a number of lasers to provide incident light to interact with the number of ions as described herein. In some examples, the incident laser light can cause an ion within the logic zone 536 to fluoresce. The logic zone 536 can also include a number of mirrors 534-1, 534-2, 534-3, 534-4 that can receive incident laser light from above the logic zone 536. The number of mirrors 534-1, 534-2, 534-3, 534-4 can receive the incident laser light from above the logic zone 536 and direct the light onto the logic zone 536 and/or ions within the logic zone 536.

Similarly to the loading zone 586, the logic zone 536 can include a number of corresponding mirrors 542-1, 542-2, 542-3, 542-4 that can receive the incident laser light from each of the number of mirrors 534-1, 534-2, 534-3, 534-4 respectively and direct the incident laser light to a beam dump. That is, incident laser light from above the logic zone 536 can be directed towards the number of mirrors 534-1, 534-2, 534-3, 534-4. The number of mirrors 534-1, 534-2, 534-3, 534-4 can direct the incident laser light across the logic zone 536 to interact with a number of ions and be received the number of corresponding mirrors 542-1, 542-2, 542-3, 542-4 and directed to a beam dump as described herein.

In some embodiments, there can be additional mirrors (not shown) that can be located to direct incident laser light from above the logic zone 536 through an orthogonal portion (e.g., parallel portion, relatively parallel portion, etc.) of the logic zone 536. In these embodiments, the additional mirrors can be located on the interposer surface in line with the logic zone 536.

The number of mirrors described herein (e.g., mirrors 534-1, 534-2, 534-3, 534-4, 542-1, 542-2, 542-3, 542-4, 582-1, 582-2, 582-3, 582-4, 584-1, 584-2, 584-3, 584-4, etc.) can include optical devices such as prism-shaped mirrors. For example, the number of mirrors can comprise a micro-prism that has been sputter-coated with a relatively high reflective non-oxidizing metal. In this example, the non-oxidizing metal can include rhodium or ruthenium. The number of micro-prisms can be positioned such that a flat portion is coupled to the silicon die or interposer surface to create a flat surface at approximately 45 degrees (e.g., 40 degrees to 50 degrees, etc.) from the silicon die or interposer surface.

The number of mirrors can be positioned on the silicon die of the trap environment system 580 and/or positioned on an interposer base of the trap environment system 580. In some embodiments, the number of mirrors can be positioned on the silicon die or the interposer base by etching a portion of the silicon die or interposer base that can fit the number of mirrors. The number of mirrors can then be coupled to the silicon die or interposer surface at the etched out portion. In some embodiments, an adhesive can be utilized to bond the number of mirrors in the etched portion of the silicon die or interposer base.

The trap environment system 580 can be utilized to increase a number of logic zones and/or loading zones for the single trap environment system 580. For example, the trap environment system 580 can increase scalability by allowing incident laser light to be received from directly above the trap environment system 580 instead of receiving the incident laser light from a laser positioned orthogonal to the trap environment system 580. In addition, the number of mirrors can enable trapping and performing logic tests for a plurality of ions simultaneously by decreasing the possibility that a plurality of lasers may negatively interact with each other. Furthermore, by receiving the incident laser light from above the trap environment system 580, the incident laser light has a relatively shorter distance to travel compared to previous systems and methods.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An apparatus for an alignment cell, comprising:
   a delivery fiber and a delivery lens coupled to an optical bench;
   a mirror to receive light from the delivery fiber through the delivery lens, wherein the received light is directed by the mirror to an ion trap on the trap surface;
   a dump mirror coupled to the trap surface to direct light passing past the ion trap to a beam dump through the optical bench; and
   a collection fiber coupled to the optical bench to receive light fluoresced from an ion in the ion trap.

2. The apparatus of claim 1, wherein the mirror is planar.

3. The apparatus of claim 1, comprising a collection lens coupled to the optical bench that corresponds to the collection fiber, wherein the received light fluoresced from the ion is directed through the collection lens.

4. The apparatus of claim 3, wherein the delivery lens and the collection lens are at least one of:
   ball lenses; and
   diffractive optical elements (DOE).

5. The apparatus of claim 1, wherein the delivery fiber and the delivery lens are coupled to the optical bench to provide light to the ion with a particular beam waist and location.

6. The apparatus of claim 1, wherein the delivery fiber and the collection fiber are coupled to the optical bench by a metal fiber ferrule.

7. A system for an alignment cell, comprising:
- a delivery fiber from a preparation cell coupled to an optical bench of the alignment cell to receive light from the preparation cell;
- a delivery mirror coupled to a trap surface of the alignment cell to alter a direction of the received light to an ion trap on the trap surface, wherein the ion trap comprises a micro mirror to direct fluoresced light from an ion in the ion trap to a collection ball lens encased in the optical bench;
- a dump mirror coupled to the trap surface to direct light passing past the ion trap to a beam dump through the optical bench; and
- a collection fiber coupled to the optical bench to receive the fluoresced light from the collection ball lens and send the fluoresced light to a detection cell coupled to the collection fiber.

8. The system of claim 7, comprising a dump mirror coupled to the trap surface to direct the received light that passes past the ion trap to a beam dump through the optical bench, wherein the dump mirror is positioned linearly from the delivery mirror on an opposite side of the trap surface.

9. The system of claim 7, wherein the collection ball lens is coupled to the optical bench by a pyramidal etch pit.

10. The system of claim 7, wherein the delivery mirror is a concave mirror.

11. The system of claim 7, wherein the delivery fiber is received at a first direction.

12. The system of claim 11, comprising an additional delivery fiber to provide light from the preparation cell to a delivery ball lens.

13. The system of claim 12, comprising a beam splitter coupled to the optical bench to combine light from the delivery fiber and the additional delivery fiber, wherein the additional delivery fiber is in an orthogonal position with the delivery fiber.

* * * * *